(12) United States Patent
Gower et al.

(10) Patent No.: US 7,765,368 B2
(45) Date of Patent: *Jul. 27, 2010

(54) SYSTEM, METHOD AND STORAGE MEDIUM FOR PROVIDING A SERIALIZED MEMORY INTERFACE WITH A BUS REPEATER

(75) Inventors: Kevin C. Gower, LaGrangeville, NY (US); Kevin W. Kark, Poughkeepsie, NY (US); Mark W. Kellogg, Henrietta, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 11/773,660

(22) Filed: Jul. 5, 2007

(65) Prior Publication Data
US 2007/0255902 A1 Nov. 1, 2007

Related U.S. Application Data

(63) Continuation of application No. 10/903,178, filed on Jul. 30, 2004, now Pat. No. 7,296,129.

(51) Int. Cl.
G06F 12/00 (2006.01)
G06F 13/00 (2006.01)

(52) U.S. Cl. .................. 711/154; 711/167; 711/115; 710/100; 710/313

(58) Field of Classification Search .......... 711/101, 711/115, 154, 156, 167, 170
See application file for complete search history.

(56) References Cited

U.S. PATENT DOCUMENTS 2,842,682 A   7/1958   Clapper
3,333,253 A   7/1967   Sahulka
3,395,400 A   7/1968   De Witt
3,825,904 A   7/1974   Burk et al. ............... 340/172.5
3,925,904 A   12/1975  Kelly
4,028,675 A   6/1977   Frankenberg ............. 711/106
4,135,240 A   1/1979   Ritchie
4,150,428 A   4/1979   Inrig et al.
4,472,780 A   9/1984   Chenoweth et al.

(Continued)

FOREIGN PATENT DOCUMENTS

EP   0229316 A2   9/1986

(Continued)

OTHER PUBLICATIONS

International Search Report, International Application No. PCT/EP2007/054929, International Publication No. WO 2007/135144 A1, received Mar. 21, 2008.

(Continued)

*Primary Examiner*—Mardochee Chery
(74) *Attorney, Agent, or Firm*—Cantor Colburn LLP

(57) ABSTRACT

A packetized cascade memory system including a plurality of memory assemblies, a memory bus including multiple segments, a bus repeater module and a segment level sparing module. The bus repeater module is in communication with two or more of the memory assemblies via the memory bus. The segment level sparing module provides segment level sparing for the communication bus upon segment failure.

20 Claims, 10 Drawing Sheets

U.S. PATENT DOCUMENTS

| | | | |
|---|---|---|---|
| 4,475,194 A | 10/1984 | LaVallee et al. ............... 371/10 |
| 4,479,214 A | 10/1984 | Ryan |
| 4,486,739 A | 12/1984 | Franaszek et al. ........... 340/347 |
| 4,641,263 A | 2/1987 | Perlman et al. |
| 4,654,857 A | 3/1987 | Samson et al. ................ 371/68 |
| 4,723,120 A | 2/1988 | Petty, Jr. ................ 340/825.02 |
| 4,740,916 A | 4/1988 | Martin ....................... 364/900 |
| 4,782,487 A | 11/1988 | Smelser |
| 4,796,231 A | 1/1989 | Pinkham ................ 365/189.05 |
| 4,803,485 A | 2/1989 | Rypinski .................... 370/452 |
| 4,833,605 A | 5/1989 | Terada et al. ................ 364/200 |
| 4,839,534 A | 6/1989 | Clasen ....................... 307/269 |
| 4,943,984 A | 7/1990 | Pechanek et al. ............ 375/109 |
| 4,964,129 A | 10/1990 | Bowden, III et al. |
| 4,964,130 A | 10/1990 | Bowden, III et al. |
| 4,985,828 A | 1/1991 | Shimizu et al. ............. 364/200 |
| 5,053,947 A | 10/1991 | Heibel et al. ................ 364/200 |
| 5,177,375 A | 1/1993 | Ogawa et al. |
| 5,206,946 A | 4/1993 | Brunk ........................... 710/2 |
| 5,214,747 A | 5/1993 | Cok ............................. 395/27 |
| 5,265,212 A | 11/1993 | Bruce, II .................... 710/113 |
| 5,287,531 A | 2/1994 | Rogers, Jr. et al. .......... 395/800 |
| 5,347,270 A | 9/1994 | Matsuda et al. ............ 340/2.21 |
| 5,357,621 A | 10/1994 | Cox |
| 5,375,127 A | 12/1994 | Leak |
| 5,387,911 A | 2/1995 | Gleichert et al. .............. 341/95 |
| 5,394,535 A | 2/1995 | Ohuchi ....................... 711/155 |
| 5,410,545 A | 4/1995 | Porter et al. |
| 5,454,091 A | 9/1995 | Sites et al. ................... 395/413 |
| 5,475,690 A | 12/1995 | Burns et al. ............... 370/105.3 |
| 5,513,135 A | 4/1996 | Dell et al. |
| 5,517,626 A | 5/1996 | Archer et al. |
| 5,522,064 A | 5/1996 | Aldereguia et al. |
| 5,544,309 A | 8/1996 | Chang et al. ........... 395/183.06 |
| 5,546,023 A | 8/1996 | Borkar et al. |
| 5,561,826 A | 10/1996 | Davies et al. |
| 5,592,632 A | 1/1997 | Leung et al. ................ 395/306 |
| 5,594,925 A | 1/1997 | Harder et al. |
| 5,611,055 A | 3/1997 | Krishan et al. .............. 395/281 |
| 5,613,077 A | 3/1997 | Leung et al. ................ 395/306 |
| 5,627,963 A | 5/1997 | Gabillard et al. .............. 714/42 |
| 5,629,685 A | 5/1997 | Allen et al. ............ 340/825.02 |
| 5,661,677 A | 8/1997 | Rondeau, II et al. .......... 365/63 |
| 5,666,480 A | 9/1997 | Leung et al. ................ 395/180 |
| 5,684,418 A | 11/1997 | Yanagiuchi |
| 5,706,346 A | 1/1998 | Katta et al. |
| 5,737,589 A | 4/1998 | Doi et al. |
| 5,754,804 A | 5/1998 | Cheselka et al. |
| 5,764,155 A | 6/1998 | Kertesz et al. ......... 340/825.08 |
| 5,822,749 A | 10/1998 | Agarwal ........................ 707/2 |
| 5,852,617 A | 12/1998 | Mote, Jr. ..................... 714/726 |
| 5,870,325 A | 2/1999 | Nielsen et al. |
| 5,872,996 A | 2/1999 | Barth et al. ................. 395/853 |
| 5,881,154 A | 3/1999 | Nohara et al. |
| 5,917,760 A | 6/1999 | Millar |
| 5,917,780 A | 6/1999 | Millar |
| 5,926,838 A | 7/1999 | Jeddeloh |
| 5,928,343 A | 7/1999 | Farmwald et al. ........... 710/104 |
| 5,930,273 A | 7/1999 | Mukojima .................. 714/776 |
| 5,959,914 A | 9/1999 | Gates et al. |
| 5,973,951 A | 10/1999 | Bechtolsheim et al. ........ 365/52 |
| 5,974,493 A | 10/1999 | Okumura et al. ............ 710/307 |
| 5,995,405 A | 11/1999 | Trick ............................ 365/63 |
| 6,003,121 A | 12/1999 | Wirt |
| 6,011,732 A | 1/2000 | Harrison et al. |
| 6,038,132 A | 3/2000 | Tokunaga et al. ........... 361/760 |
| 6,049,476 A | 4/2000 | Laudon et al. ................ 365/52 |
| 6,076,158 A | 6/2000 | Sites et al. ................... 712/230 |
| 6,078,515 A | 6/2000 | Nielsen et al. ................. 365/63 |
| 6,081,868 A | 6/2000 | Brooks |
| 6,085,276 A | 7/2000 | VanDoren et al. |
| 6,088,817 A | 7/2000 | Haulin |
| 6,096,091 A | 8/2000 | Hartmann .................... 716/17 |
| 6,128,746 A | 10/2000 | Clark et al. ................. 713/324 |
| 6,145,028 A | 11/2000 | Shank et al. |
| 6,158,040 A | 12/2000 | Ho |
| 6,170,047 B1 | 1/2001 | Dye ............................ 711/170 |
| 6,170,059 B1 | 1/2001 | Pruett et al. ................. 713/200 |
| 6,173,382 B1 | 1/2001 | Dell et al. .................... 711/170 |
| 6,185,718 B1 | 2/2001 | Dell et al. |
| 6,198,304 B1 | 3/2001 | Sasaki |
| 6,215,686 B1 | 4/2001 | Deneroff et al. .............. 365/52 |
| 6,216,247 B1 | 4/2001 | Creta et al. |
| 6,219,288 B1 | 4/2001 | Braceras et al. |
| 6,219,760 B1 | 4/2001 | McMinn |
| 6,233,639 B1 | 5/2001 | Dell et al. |
| 6,260,127 B1 | 7/2001 | Olarig et al. ................. 711/167 |
| 6,262,493 B1 | 7/2001 | Garnett |
| 6,285,172 B1 | 9/2001 | Torbey |
| 6,292,903 B1 | 9/2001 | Coteus et al. |
| 6,301,636 B1 | 10/2001 | Schultz et al. .............. 711/108 |
| 6,308,247 B1 | 10/2001 | Ackerman et al. |
| 6,317,352 B1 | 11/2001 | Halbert et al. ................. 365/52 |
| 6,321,343 B1 | 11/2001 | Toda .......................... 713/600 |
| 6,338,113 B1 | 1/2002 | Kubo et al. ................. 711/105 |
| 6,349,390 B1 | 2/2002 | Dell et al. |
| 6,357,018 B1 | 3/2002 | Stuewe et al. |
| 6,370,631 B1 | 4/2002 | Dye ............................ 711/170 |
| 6,378,018 B1 | 4/2002 | Tsern et al. ................. 710/129 |
| 6,381,685 B2 | 4/2002 | Dell et al. |
| 6,393,512 B1 | 5/2002 | Chen et al. |
| 6,393,528 B1 | 5/2002 | Arimilli et al. .............. 711/137 |
| 6,408,398 B1 | 6/2002 | Frecker et al. |
| 6,425,044 B1 | 7/2002 | Jeddeloh |
| 6,446,174 B1 | 9/2002 | Dow |
| 6,446,224 B1 | 9/2002 | Chang et al. |
| 6,467,013 B1 | 10/2002 | Nizar |
| 6,473,836 B1 | 10/2002 | Ikeda ......................... 711/137 |
| 6,477,614 B1 | 11/2002 | Leddige et al. |
| 6,483,755 B2 | 11/2002 | Leung et al. ........... 365/189.05 |
| 6,484,271 B1 | 11/2002 | Gray |
| 6,487,102 B1 | 11/2002 | Halbert et al. |
| 6,487,627 B1 | 11/2002 | Willke et al. ................. 710/306 |
| 6,493,250 B2 | 12/2002 | Halbert et al. ................. 365/63 |
| 6,496,540 B1 | 12/2002 | Widmer ...................... 375/242 |
| 6,496,910 B1 | 12/2002 | Baentsch et al. ............ 711/165 |
| 6,499,070 B1 | 12/2002 | Whetsel ....................... 710/71 |
| 6,502,161 B1 | 12/2002 | Perego et al. ................... 711/5 |
| 6,505,305 B1 | 1/2003 | Olarig |
| 6,507,888 B2 | 1/2003 | Wu et al. .................... 711/105 |
| 6,510,100 B2 | 1/2003 | Grundon et al. ............. 365/233 |
| 6,513,091 B1 | 1/2003 | Blackmon et al. ............ 710/316 |
| 6,530,007 B2 | 3/2003 | Olarig et al. |
| 6,532,525 B1 | 3/2003 | Aleksic et al. ............. 711/168 |
| 6,546,359 B1 | 4/2003 | Week |
| 6,549,971 B1 | 4/2003 | Cecchi et al. ................ 710/306 |
| 6,553,450 B1 | 4/2003 | Dodd et al. ................. 711/105 |
| 6,557,069 B1 | 4/2003 | Drehmel et al. |
| 6,564,329 B1 | 5/2003 | Cheung et al. .............. 713/322 |
| 6,584,576 B1 | 6/2003 | Co |
| 6,587,912 B2 | 7/2003 | Leddige et al. |
| 6,590,827 B2 | 7/2003 | Chang et al. |
| 6,594,713 B1 | 7/2003 | Fuocco et al. |
| 6,594,748 B1 | 7/2003 | Lin |
| 6,601,121 B2 | 7/2003 | Singh et al. ................. 710/112 |
| 6,601,149 B1 | 7/2003 | Brock et al. |
| 6,604,180 B2 | 8/2003 | Jeddeloh |
| 6,611,905 B1 | 8/2003 | Grundon et al. ............. 711/167 |
| 6,622,217 B2 | 9/2003 | Gharacorloo et al. ........ 711/141 |
| 6,622,227 B2 | 9/2003 | Zumkehr et al. |
| 6,625,687 B1 | 9/2003 | Halber et al. ............... 711/105 |
| 6,625,702 B2 | 9/2003 | Rentschler et al. |
| 6,628,538 B2 | 9/2003 | Funaba et al. ................. 365/63 |
| 6,631,439 B2 | 10/2003 | Saulsbury et al. |

| | | |
|---|---|---|
| 6,636,957 B2 | 10/2003 | Stevens et al. |
| 6,643,745 B1 | 11/2003 | Palanca et al. |
| 6,671,376 B1 | 12/2003 | Koto et al. ............... 380/210 |
| 6,678,811 B2 | 1/2004 | Rentschler et al. ......... 711/167 |
| 6,681,292 B2 | 1/2004 | Creta et al. |
| 6,684,320 B2 | 1/2004 | Mohamed et al. |
| 6,697,919 B2 | 2/2004 | Gharachorloo et al. ...... 711/141 |
| 6,704,842 B1 | 3/2004 | Janakiraman et al. |
| 6,721,185 B2 | 4/2004 | Dong et al. |
| 6,721,944 B2 | 4/2004 | Chaudhry et al. |
| 6,738,836 B1 | 5/2004 | Kessler et al. |
| 6,741,096 B2 | 5/2004 | Moss |
| 6,748,518 B1 | 6/2004 | Guthrie et al. |
| 6,754,762 B1 | 6/2004 | Curley |
| 6,766,389 B2 | 7/2004 | Hayter et al. |
| 6,775,747 B2 | 8/2004 | Venkatraman |
| 6,791,555 B1 | 9/2004 | Radke et al. |
| 6,792,495 B1 | 9/2004 | Garney et al. |
| 6,799,241 B2 | 9/2004 | Kahn et al. |
| 6,832,329 B2 | 12/2004 | Ahrens et al. |
| 6,839,393 B1 | 1/2005 | Sidiropoulos ............... 375/371 |
| 6,845,472 B2 | 1/2005 | Walker et al. |
| 6,877,076 B1 | 4/2005 | Cho et al. |
| 6,877,078 B2 | 4/2005 | Fujiwara et al. |
| 6,882,082 B2 | 4/2005 | Greeff et al. |
| 6,889,284 B1 | 5/2005 | Nizar et al. |
| 6,898,726 B1 | 5/2005 | Lee |
| 6,910,146 B2 | 6/2005 | Dow |
| 6,918,068 B2 | 7/2005 | Vail et al. |
| 6,925,534 B2 | 8/2005 | David |
| 6,938,119 B2 | 8/2005 | Kohn et al. |
| 6,944,084 B2 | 9/2005 | Wilcox |
| 6,948,091 B2 | 9/2005 | Bartels et al. |
| 6,949,950 B2 | 9/2005 | Takahashi et al. |
| 6,965,952 B2 | 11/2005 | Echartea et al. |
| 6,977,536 B2 | 12/2005 | Chin-Chieh et al. ......... 327/116 |
| 6,977,979 B1 | 12/2005 | Hartwell et al. |
| 6,993,612 B2 | 1/2006 | Porterfield |
| 6,996,639 B2 | 2/2006 | Narad |
| 6,996,766 B2 | 2/2006 | Cypher |
| 7,039,755 B1 | 5/2006 | Helms |
| 7,047,370 B1 | 5/2006 | Jeter, Jr. et al. |
| 7,047,371 B2 | 5/2006 | Dortu |
| 7,047,373 B2 | 5/2006 | Jeter, Jr. et al. |
| 7,047,384 B2 | 5/2006 | Bodas et al. |
| 7,076,700 B2 | 7/2006 | Rieger |
| 7,091,890 B1 | 8/2006 | Sasaki et al. |
| 7,103,792 B2 | 9/2006 | Moon |
| 7,120,743 B2 | 10/2006 | Meyer et al. |
| 7,133,790 B2 | 11/2006 | Liou |
| 7,133,972 B2 | 11/2006 | Jeddeloh |
| 7,155,016 B1 | 12/2006 | Betts et al. |
| 7,177,211 B2 | 2/2007 | Zimmerman ............... 365/201 |
| 7,194,593 B2 | 3/2007 | Schnepper |
| 7,197,594 B2 | 3/2007 | Raz et al. |
| 7,197,670 B2 | 3/2007 | Boatright et al. |
| 7,203,318 B2 | 4/2007 | Collum et al. |
| 7,206,887 B2 | 4/2007 | Jeddeloh |
| 7,206,962 B2 | 4/2007 | Deegan et al. |
| 7,210,059 B2 | 4/2007 | Jeddeloh |
| 7,216,196 B2 | 5/2007 | Jeddeloh |
| 7,216,276 B1 | 5/2007 | Azimi et al. |
| 7,222,213 B2 | 5/2007 | James |
| 7,227,949 B2 | 6/2007 | Heegard et al. |
| 7,240,145 B2 | 7/2007 | Holman |
| 7,260,685 B2 | 8/2007 | Lee et al. |
| 7,266,634 B2 | 9/2007 | Ware et al. |
| 7,269,765 B1 | 9/2007 | Charlton et al. |
| 7,296,129 B2 | 11/2007 | Gower et al. |
| 7,313,583 B2 | 12/2007 | Porten et al. |
| 7,319,340 B2 | 1/2008 | Jeddeloh et al. |
| 7,321,979 B2 | 1/2008 | Lee |
| 7,334,159 B1 | 2/2008 | Callaghan |
| 7,353,316 B2 | 4/2008 | Erdmann |
| 7,363,419 B2 | 4/2008 | Cronin et al. |
| 7,363,436 B1 | 4/2008 | Yeh et al. |
| 7,370,134 B2 | 5/2008 | Jeddeloh |
| 7,376,146 B2 | 5/2008 | Beverly et al. |
| 7,386,575 B2 | 6/2008 | Bashant et al. |
| 7,386,771 B2 | 6/2008 | Shuma |
| 7,404,118 B1 | 7/2008 | Baguette et al. |
| 7,418,526 B2 | 8/2008 | Jeddeloh |
| 7,421,525 B2 | 9/2008 | Polzin et al. |
| 7,430,145 B2 | 9/2008 | Weiss et al. |
| 7,433,258 B2 | 10/2008 | Rao et al. |
| 2001/0003839 A1 | 6/2001 | Kondo ........................ 711/144 |
| 2001/0029566 A1 | 10/2001 | Woo |
| 2001/0029592 A1 | 10/2001 | Walker et al. |
| 2002/0019926 A1 | 2/2002 | Huppenthal et al. ........... 712/15 |
| 2002/0059439 A1 | 5/2002 | Arroyo et al. |
| 2002/0083255 A1 | 6/2002 | Greeff et al. ................. 710/305 |
| 2002/0103988 A1 | 8/2002 | Dornier ........................ 712/38 |
| 2002/0112119 A1 | 8/2002 | Halbert et al. .............. 711/115 |
| 2002/0112194 A1 | 8/2002 | Uzelac ........................ 713/500 |
| 2002/0124195 A1 | 9/2002 | Nizar ........................ 713/320 |
| 2002/0124201 A1 | 9/2002 | Edwards et al. |
| 2002/0174274 A1 | 11/2002 | Wu et al. .................... 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. .............. 709/203 |
| 2003/0051055 A1 | 3/2003 | Parrella et al. |
| 2003/0056183 A1 | 3/2003 | Kobayashi |
| 2003/0084295 A1 | 5/2003 | Kohn ........................ 713/189 |
| 2003/0090879 A1 | 5/2003 | Doblar et al. |
| 2003/0105938 A1 | 6/2003 | Cooksey et al. |
| 2003/0118044 A1 | 6/2003 | Blanc et al. |
| 2003/0126354 A1 | 7/2003 | Kahn et al. |
| 2003/0126363 A1 | 7/2003 | David |
| 2003/0223303 A1 | 12/2003 | Lamb et al. ............. 365/230.06 |
| 2003/0229770 A1 | 12/2003 | Jeddeloh |
| 2003/0235222 A1 | 12/2003 | Bridges et al. |
| 2003/0236959 A1 | 12/2003 | Johnson et al. ............. 711/167 |
| 2004/0006674 A1 | 1/2004 | Hargis et al. ................ 711/156 |
| 2004/0015650 A1 | 1/2004 | Zumkehr et al. |
| 2004/0049723 A1 | 3/2004 | Obara ........................ 714/729 |
| 2004/0078615 A1 | 4/2004 | Martin et al. |
| 2004/0098546 A1 | 5/2004 | Bashant et al. |
| 2004/0098549 A1 | 5/2004 | Dorst |
| 2004/0117588 A1 | 6/2004 | Arimilli et al. .............. 711/203 |
| 2004/0123222 A1 | 6/2004 | Widmer |
| 2004/0128474 A1 | 7/2004 | Vorbach ........................ 712/10 |
| 2004/0148482 A1 | 7/2004 | Grundy et al. |
| 2004/0160832 A1 | 8/2004 | Janzen et al. |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. |
| 2004/0246767 A1 | 12/2004 | Vogt ........................... 365/154 |
| 2004/0250153 A1 | 12/2004 | Vogt ........................... 713/500 |
| 2004/0260909 A1 | 12/2004 | Lee et al. |
| 2004/0260957 A1 | 12/2004 | Jeddeloh et al. |
| 2005/0022065 A1 | 1/2005 | Dixon et al. |
| 2005/0023560 A1 | 2/2005 | Ahn et al. .................... 257/200 |
| 2005/0027941 A1 | 2/2005 | Wang et al. |
| 2005/0033906 A1 | 2/2005 | Mastronarde et al. |
| 2005/0044305 A1 | 2/2005 | Jakobs et al. |
| 2005/0050237 A1 | 3/2005 | Jeddeloh et al ............... 710/10 |
| 2005/0050255 A1 | 3/2005 | Jeddeloh ..................... 710/317 |
| 2005/0060600 A1 | 3/2005 | Jeddeloh |
| 2005/0066136 A1 | 3/2005 | Schnepper .................. 711/154 |
| 2005/0071542 A1 | 3/2005 | Weber et al. |
| 2005/0071707 A1 | 3/2005 | Hampel |
| 2005/0078506 A1 | 4/2005 | Rao et al. |
| 2005/0080581 A1 | 4/2005 | Zimmerman et al. ......... 702/117 |
| 2005/0081085 A1 | 4/2005 | Ellis et al. |

| | | | |
|---|---|---|---|
| 2005/0081114 A1 | 4/2005 | Ackaret et al. | |
| 2005/0081129 A1 | 4/2005 | Shah et al. | |
| 2005/0086424 A1 | 4/2005 | Oh et al. | |
| 2005/0086441 A1 | 4/2005 | Myer et al. | |
| 2005/0097249 A1 | 5/2005 | Oberlin et al. | |
| 2005/0105350 A1 | 5/2005 | Zimmerman et al. | |
| 2005/0120157 A1 | 6/2005 | Chen et al. | 710/313 |
| 2005/0125702 A1 | 6/2005 | Huang et al. | |
| 2005/0125703 A1 | 6/2005 | Lefurgy et al. | |
| 2005/0138246 A1 | 6/2005 | Chen et al. | |
| 2005/0138267 A1 | 6/2005 | Bains et al. | 711/100 |
| 2005/0144399 A1 | 6/2005 | Hosomi | 711/145 |
| 2005/0149665 A1 | 7/2005 | Wolrich et al. | |
| 2005/0166006 A1 | 7/2005 | Talbot et al. | |
| 2005/0177677 A1 | 8/2005 | Jeddeloh | |
| 2005/0177690 A1 | 8/2005 | LaBerge | 711/154 |
| 2005/0204216 A1 | 9/2005 | Daily et al. | 714/724 |
| 2005/0216678 A1 | 9/2005 | Jeddeloh | |
| 2005/0220097 A1 | 10/2005 | Swami et al. | |
| 2005/0223196 A1 | 10/2005 | Knowles | |
| 2005/0229132 A1 | 10/2005 | Butt et al. | 716/10 |
| 2005/0248997 A1 | 11/2005 | Lee | |
| 2005/0257005 A1 | 11/2005 | Jeddeloh | |
| 2005/0259496 A1 | 11/2005 | Hsu et al. | 365/226 |
| 2005/0289292 A1 | 12/2005 | Morrow et al. | |
| 2005/0289377 A1 | 12/2005 | Luong | |
| 2006/0004953 A1 | 1/2006 | Vogt | |
| 2006/0010339 A1 | 1/2006 | Klein | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0085602 A1 | 4/2006 | Huggahalli et al. | |
| 2006/0095592 A1 | 5/2006 | Borkenhagen | |
| 2006/0095679 A1 | 5/2006 | Edirisooriya | |
| 2006/0104371 A1 | 5/2006 | Schuermans et al. | |
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0224764 A1 | 10/2006 | Shinohara et al. | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2007/0160053 A1 | 7/2007 | Coteus | |
| 2008/0043808 A1 | 2/2008 | Hsu et al. | |
| 2008/0162807 A1 | 7/2008 | Rothman et al. | |
| 2008/0163014 A1 | 7/2008 | Crawford et al. | |
| 2008/0222379 A1 | 9/2008 | Jeddeloh | |
| 2009/0006900 A1 | 1/2009 | Lastras-Montano et al. | |

FOREIGN PATENT DOCUMENTS

| | | |
|---|---|---|
| EP | 0229316 A2 | 7/1987 |
| EP | 0470734 A1 | 2/1992 |
| EP | 0470734 A1 | 2/1992 |
| EP | 0899743 A2 | 6/1998 |
| EP | 0899743 B1 | 3/1999 |
| EP | 1429340 A2 | 6/2004 |
| GB | 2396711 A | 6/2004 |
| GB | 2396711 A | 6/2004 |
| JP | 59153353 | 9/1984 |
| JP | 59153353 A | 9/1984 |
| JP | 0114140 A | 6/1989 |
| JP | 401144140 A | 6/1989 |
| JP | 0432614 | 11/1992 |
| JP | 04326140 A | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9621188 A1 | 7/1996 |
| WO | 9812651 | 3/1998 |
| WO | 9812651 A1 | 3/1998 |
| WO | 0004481 A2 | 1/2000 |
| WO | 0223353 A2 | 3/2002 |
| WO | 2005038660 A2 | 4/2005 |
| WO | WO2005038660 | 4/2005 |
| WO | 2007109888 | 10/2007 |
| WO | 2007109888 A1 | 10/2007 |

OTHER PUBLICATIONS

European Search Report, European Patent Application 05106700.7, received Aug. 11, 2008.

European Search Report, European Patent Application No. 05106701.5, mailed Oct. 7, 2008, 5 pages.

European Search Report, European Patent Application No. 05109837.4, mailed Oct. 7, 2008, 5 pages.

International Search Report, International Patent Application No. PCT/US07/75944, mailed Sep. 23, 2008, 3 pages.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

PCT International Search Report PCT/EP2006/068984. Mailed Feb. 16, 2007.

PCT International Search Report PCT/EP2007/057916. Mailed Dec. 14, 2007.

PCT Search Report. PCT/EP2007/057915. Mailed Nov. 7, 2007.

Boudon, et al., "Novel Bus Reconfiguration Scheme With Spare Lines", IBM Technical Disclosure Bulletin, May 1987, vol. 29, No. 12, pp. 1-3.

Rosenberg, "Dictionary of Computers, Information Processing & Telecommuications", Second Edition, John Wiley & Sons, Inc. 1987. 3 pgs.

Singh, S., et al., "Bus Sparing for Fault-Tolerant System Design", IBM Technical Disclosure Bulletin, Dec. 1991, vol. 34, No. 71, pp. 117-118.

NB940259 (IBM Technical Disclosure Bulletin, Feb. 1994; vol. 37; pp. 59-64).

Nilsen, "High-Level Dynamic Memory Management for Object-Oriented Real-Time Systems", Jan. 1, 1996, pp. 86-93.

Massoud Pedram, "Power Minimization in IC Design Principles and Applications", ACM Transactions on Design Automation of Electronic Systems vol. 1, No. 1, Jan. 1996, pp. 3-56.

Jungjoon Kim et al.; "Performance and Architecture Features of Segmented Multiple Bus System;" IEEE Computer Society; Sep. 21-24, 1999 International Conference on Parallel Processing (ICPP '99).

Benini, et al., "System-Level Powers Optimization: Techniques and Tools", ACM Transactions on Design Automation of Electronic Systems, vol. 5, No. 2, Apr. 2000, pp. 115-192.

P.R. Panda, "Data and Memory Optimization Techniques For Embedded Systems", ACM Transactions on Design Automation of Electronic Systems, vol. 6, No. 2, Apr. 2001, pp. 149-206.

Brown, et al "Compiler-Based I/O Prefetching for Out-of-Core Applications", ACM Transactions on Computer Systems, vol. 19, No. 2, May 2001, pp. 111-170.

IEEE, "IEEE Standard Test Access Port and Boundary-Scan Architecture", Jul. 23, 2001, IEEE Std 1149-1-2001, pp. 11-13.

Wang, et al., "Guided Region Prefetching: A Cooperative Hardware/Software Approach", Jun. 2003, pp. 388-398.

Seceleanu et al.; "Segment Arbiter as Action System;" IEEE Jul. 2003 pp. 249-252.

JEDEC Solid State Technology Association, "JEDEC Standard: DDR2 SDRAM Specification", Jan. 2004, JEDEC, Revision JESD79-2A, p. 10.

Natarajan, et al., "A Study of Performance Impact of Memory Controller Features in Multi-Processor Server Environment", Jun. 2004, pp. 80-87.

Sivencrona et al.; "RedCAN™: Simulations of two Fault Recovery Algorithms for CAN;" Proceedings for the 10th IEEE Pacific Rim International Symposium on Dependable Computing (PRDC'04); Mar. 3-5, 2005.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online]; [retrieved on Feb. 23, 2006]; retrieved from the Internet.

Wikipedia, Serial Communications, [online], [retrieved Apr. 10, 2007 from the Internet], http://en.wikipedia.org/wiki/Serial_communications,page.

Jeddeloh, Fully Buffered DIMM (FB-DIMM), XP002490174, Advanced Systems Technology, Micron Technology, Inc. Apr. 16, 2008, 23 pages.

"Using Dual and Mappable Spare Bus", XP000433763, IBM Technical Disclosure Bulletin, vol. 37, No. 2B, IBM Copr., NY, US, Feb. 1, 1994, pp. 59-63.

Dell, "The RAS Implications of DIMM Connector Failure Rates in Large, Highly Available Server Systems", Ed.-Anonymous, The 53rd IEEE Holm Conference on Electrical Contacts, IEEE, PI, Sep. 1, 2007, pp. 256-261.

Li, P; Martinez et al., "Development and evaluation of a high performance fine pitch SODIMM socket package." Electronic Components and Technology Conference, 2004. Proceedings. 54th, vol. 1, pp. 1161-1166, Jun. 1-4, 2004.

Yang, Q.; Bhuyan, L.N., "Analysis of packet-switched multiple-bus multiprocessor systems," Computers, IEEE Transactions on, vol. 40, No. 3, pp. 352-357, Mar. 1991.

PCT Search Report PCT/EP2007/057916. Mailed Dec. 14, 2007.

PCT Search Report PCT/EP2007/057915. Mailed Jul. 31, 2007.

PCT Search Report PCT/EP2007/054929. Mailed Sep. 6, 2007.

PCT Search Report PCT/EP2006/068984. Mailed Feb. 9, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.; Hubbard, K.; Jie Xue; Poh, E.; Ong MeiLin; Chok KengYen; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

Seceleanu et al.; "Segment Arbiter as Action System;" IEEE 2003 pp. 249-252.

U.S. Appl. No. 11/419,586 filed May 22, 2006. Robert Tremaine. "Systems and Methods for Providing Remote Pre-Fetch Buffers".

Wikipedia, Serial Communications, [online], [retrieved Apr. 10, 2007 from the Internet], http://en.wikipedia.org/wiki/Serial_communications,p. 1.

IBM. IBM WebSphere Enterprise Service Bus. Version 6.0.2 2006 (165-0071-USC NOA Jun. 12, 2009).

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).

Oracle. Oracle Enterprise Service Bus. Oracle Data Sheet. Oct. 2006 (165-0071-USC NOA Jun. 12, 2009).

TYPICAL LARGE-SYSTEM MEMORY CONFIGURATION

SYSTEM, METHOD AND STORAGE MEDIUM FOR PROVIDING A SERIALIZED MEMORY INTERFACE WITH A BUS REPEATER

CROSS REFERENCE TO RELATED APPLICATION

This application is a continuation application of U.S. Ser. No. 10/903,178, filed Jul. 30, 2004, now U.S. Pat. No. 7,296,129, the contents of which are incorporated by reference herein in their entirety.

BACKGROUND OF THE INVENTION

The invention relates to memory subsystems and in particular, to providing a serialized memory interface with a bus repeater.

Computer memory subsystems have evolved over the years, but continue to retain many consistent attributes. Computer memory subsystems from the early 1980's, such as the one disclosed in U.S. Pat. No. 4,475,194 to LeVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory subsystem 10 that includes up to four registered dual inline memory modules (DIMMs) 40 on a traditional multi-drop stub bus channel. The subsystem includes a memory controller 20, an external clock buffer 30, registered DIMMs 40, address bus 50, control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EE-PROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. The memory controller 111 is connected to a memory bus 315, which further connects to module 310a. The information on bus 315 is re-driven by the buffer on module 310a to the next module, 310b, which further re-drives the bus 315 to module positions denoted as 31 On. Each module 310a includes a DRAM 311 a and a buffer 320a. The bus 315 may be described as having a daisy chain structure, with each bus being point-to-point in nature.

One drawback to the use of a daisy chain bus is that it increases the probability of a failure causing multiple memory modules to be affected along the bus. For example, if the first module is non-functional, then the second and subsequent modules on the bus will also be non-functional. Another drawback to the use of a daisy chain bus is that the memory latency of each memory module on the daisy chain varies based on the placement of the memory module in the daisy chain.

BRIEF SUMMARY OF THE INVENTION

Exemplary embodiments of the present invention include a packetized cascade memory system including a plurality of memory assemblies, a memory bus including multiple segments, a bus repeater module and a segment level sparing module. The bus repeater module is in communication with two or more of the memory assemblies via the memory bus. The segment level sparing module provides segment level sparing for the communication bus upon segment failure.

Additional exemplary embodiments include a method for providing a memory interface. The method includes receiving an input signal at a bus repeater module, the input signal from a memory bus including a plurality of segments. A mode associated with the bus repeater module is determined. Bits in the input signal are repositioned in response to one of the bits being associated with a failing segment. The input signal is then transmitted, via the memory bus, to one or more memory assemblies in response to the mode.

Further exemplary embodiments include a storage medium for providing a memory interface. The storage medium is encoded with machine readable computer program code and includes instructions for causing a computer to implement a method. The method includes receiving an input signal at a bus repeater module, the input signal from a memory bus including a plurality of segments. A mode associated with the bus repeater module is determined. Bits in the input signal are repositioned in response to one of the bits being associated with a failing segment. The input signal is then transmitted, via the memory bus, to one or more memory assemblies in response to the mode.

Still further exemplary embodiments include a packetized cascade communication system. The system includes a plurality of communication assemblies, a communication bus, a bus repeater module and a segment level sparing module. The communication bus includes multiple segments. The bus repeater module is in communication with two or more of the communication assemblies via the communication bus and the segment level sparing module provides segment level sparing for the communication bus upon segment failure.

Additional exemplary embodiments include a method for providing a communication interface. The method includes receiving an input signal at a bus repeater module, the input signal from a communication bus including a plurality of segments. A mode associated with the bus repeater module is determined. Bits in the input signal are repositioned in response to one of the bits being associated with a failing segment. The input signal is then transmitted, via the communication bus, to one or more communication assemblies in response to the mode.

Further exemplary embodiments include a storage medium for providing a communication interface. The storage medium is encoded with machine readable computer program code and includes instructions for causing a computer to implement a method. The method includes receiving an input signal at a bus repeater module, the input signal from a communication bus including a plurality of segments. A mode associated with the bus repeater module is determined. Bits in the input signal are repositioned in response to one of the bits being associated with a failing segment. The input signal is then transmitted, via the communication bus, to one or more communication assemblies in response to the mode.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide a flexible, high speed and high reliability memory system architecture and interconnect structure that includes a single-ended, point-to-point interconnection between any two high speed interconnection interfaces. The memory subsystem may be implemented in one of several structures depending on desired attributes such as reliability, performance, density, space, cost, component reuse and other elements. Exemplary embodiments of the present invention include a memory controller, memory modules and a bus repeater situated between the memory controller and the memory modules (or between two or more memory modules). The use of a bus repeater module (also referred to as a bus repeater chip) permits an increase in the maximum operating length between the memory controller and the memory modules while reducing average memory latency by having a direct point-to-point connection to and from the memory modules. By utilizing a point-to-point bus structure, an error within a single memory module will not affect the functionality of other memory modules in the memory subsystem. The bus repeater module includes several switching modes and may be adapted to either buffered memory modules and/or directly connected to a memory controller via a packetized, multi-transfer interface with enhanced reliability features. In addition, the bus repeater module may be utilized with unbuffered and/or registered memory modules in conjunction with the identical buffer device, or an equivalent bus, programmed to operate in a manner consistent with the memory interface defined for those module types.

Figure 1:
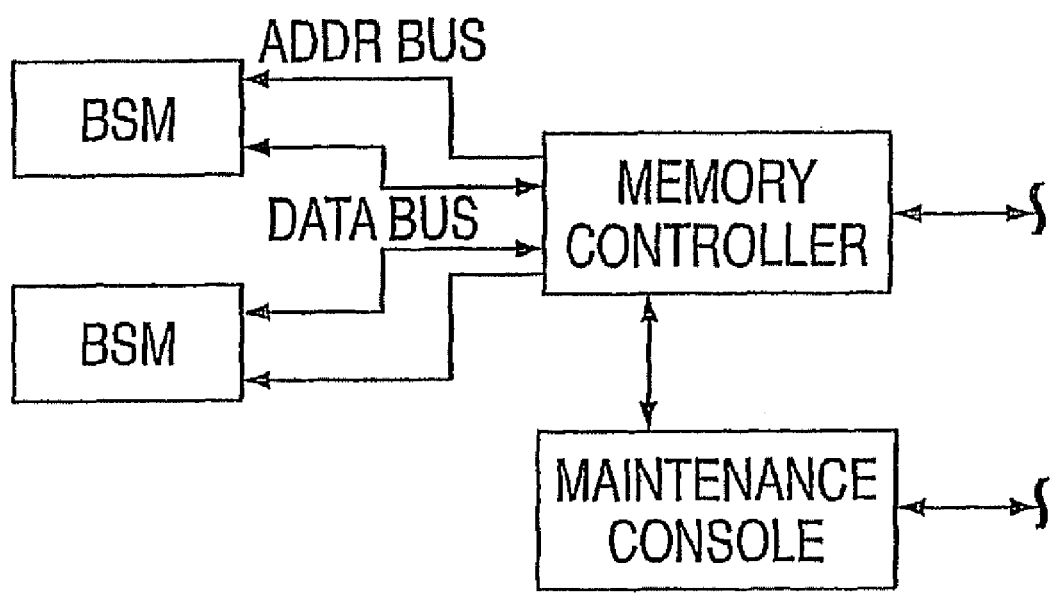
FIG. 1 depicts a prior art memory controller connected to two buffered memory assemblies via separate point-to-point links.
Figure 2:
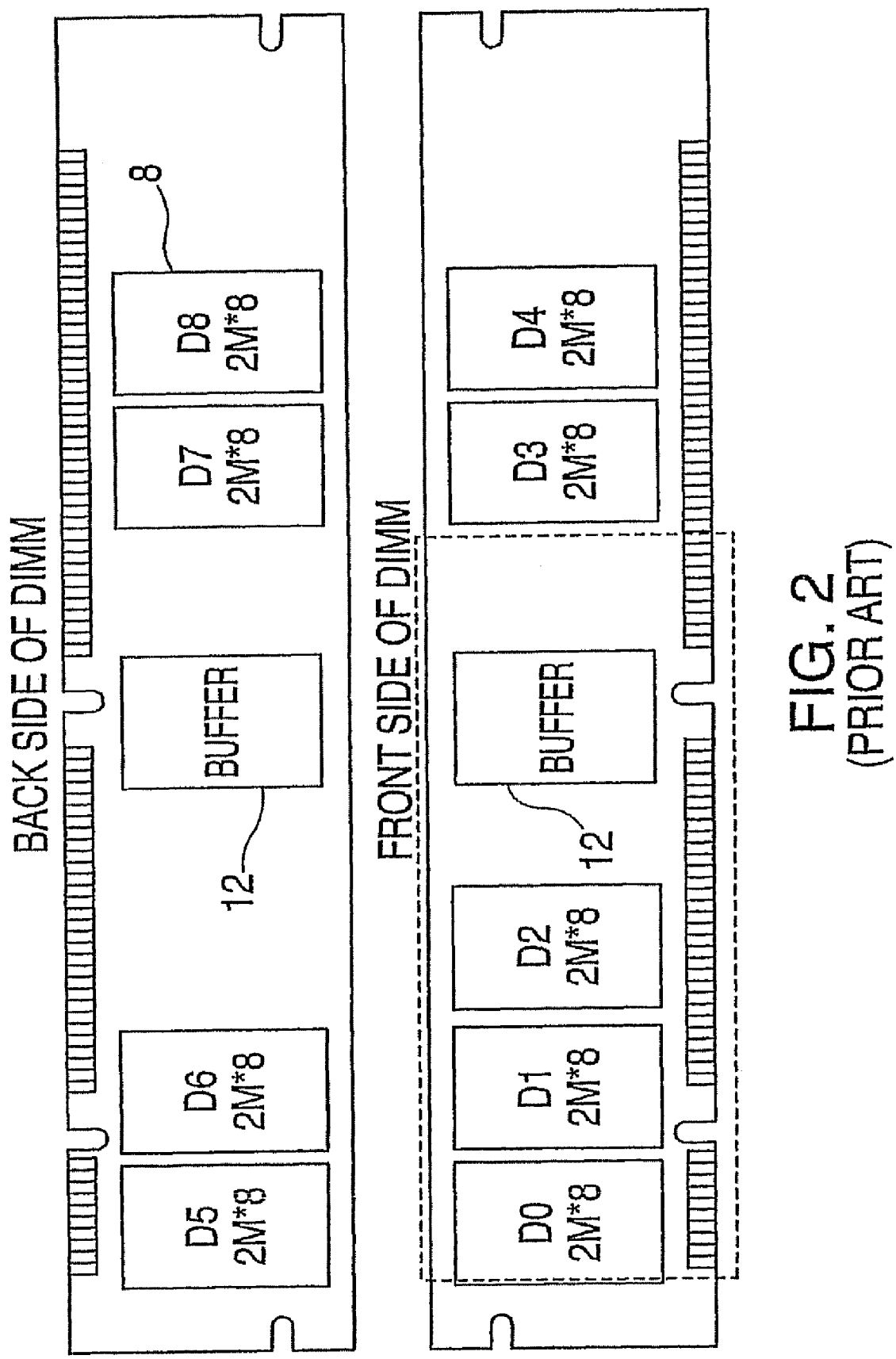
FIG. 2 depicts a prior art synchronous memory module with a buffer device.
Figure 3:
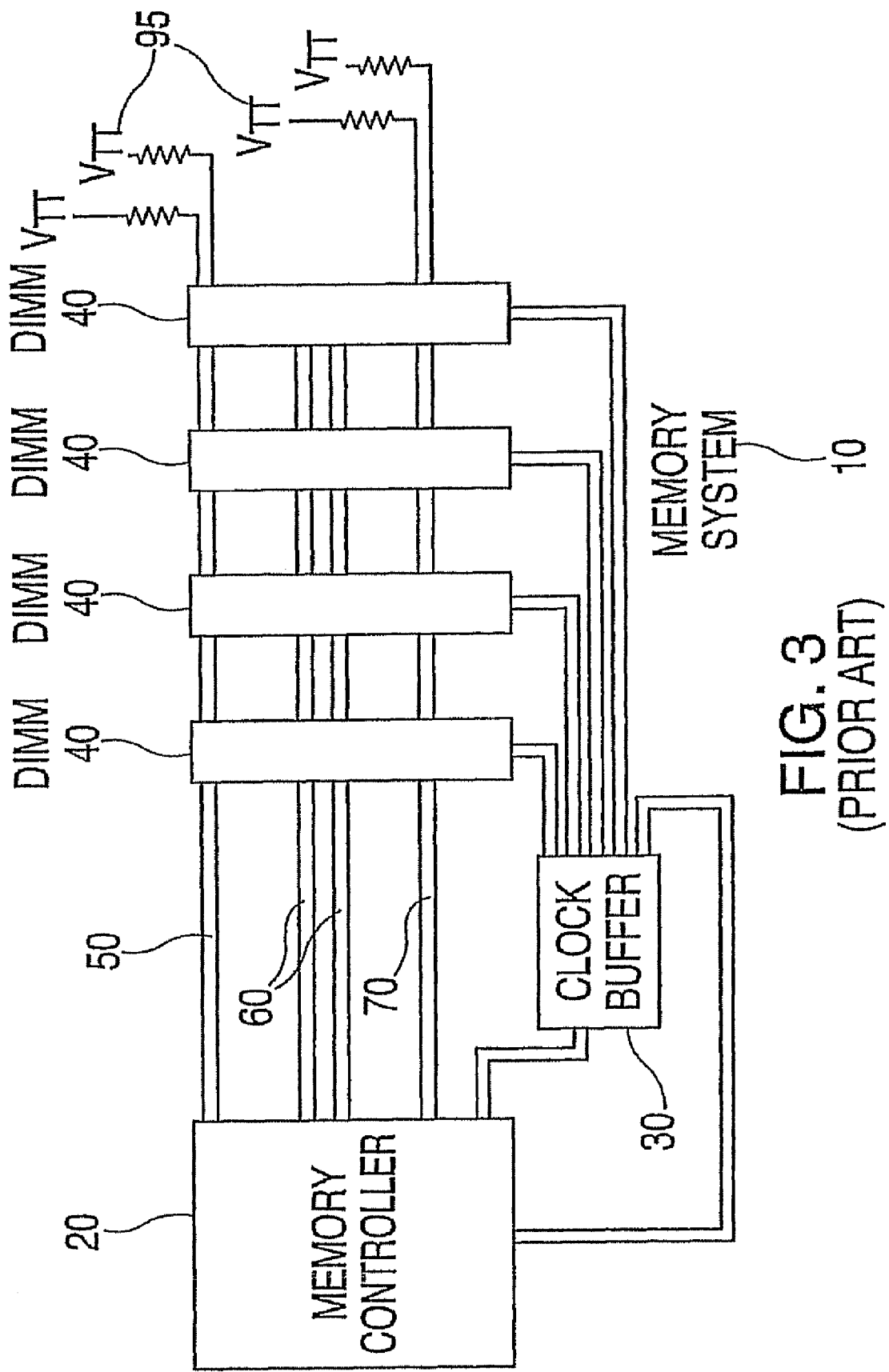
FIG. 3 depicts a prior art memory subsystem using registered DIMMs.
Figure 4:
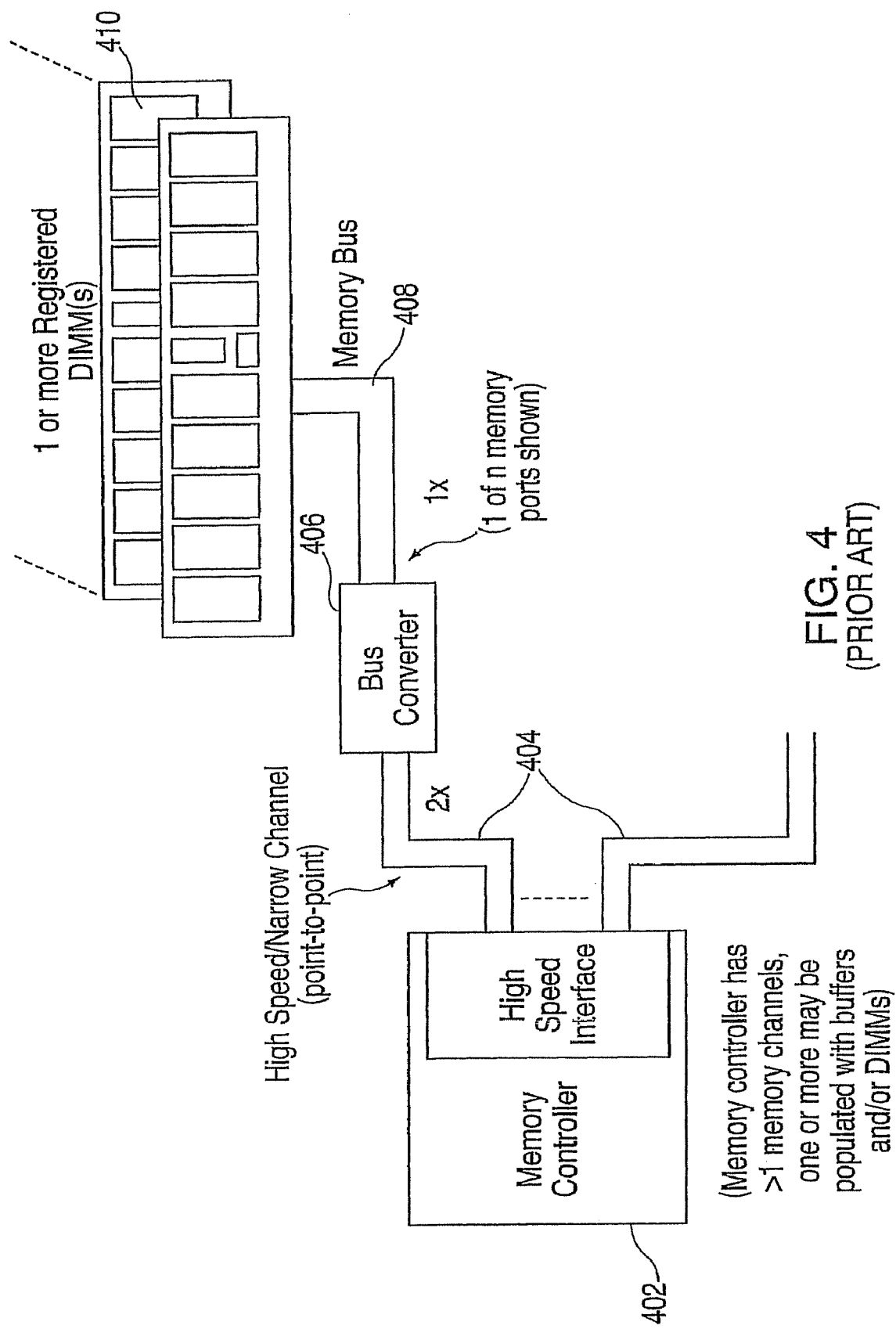
FIG. 4 depicts a prior art memory subsystem with point-to-point channels, registered DIMMs, and a 2:1 bus speed multiplier
Figure 5:
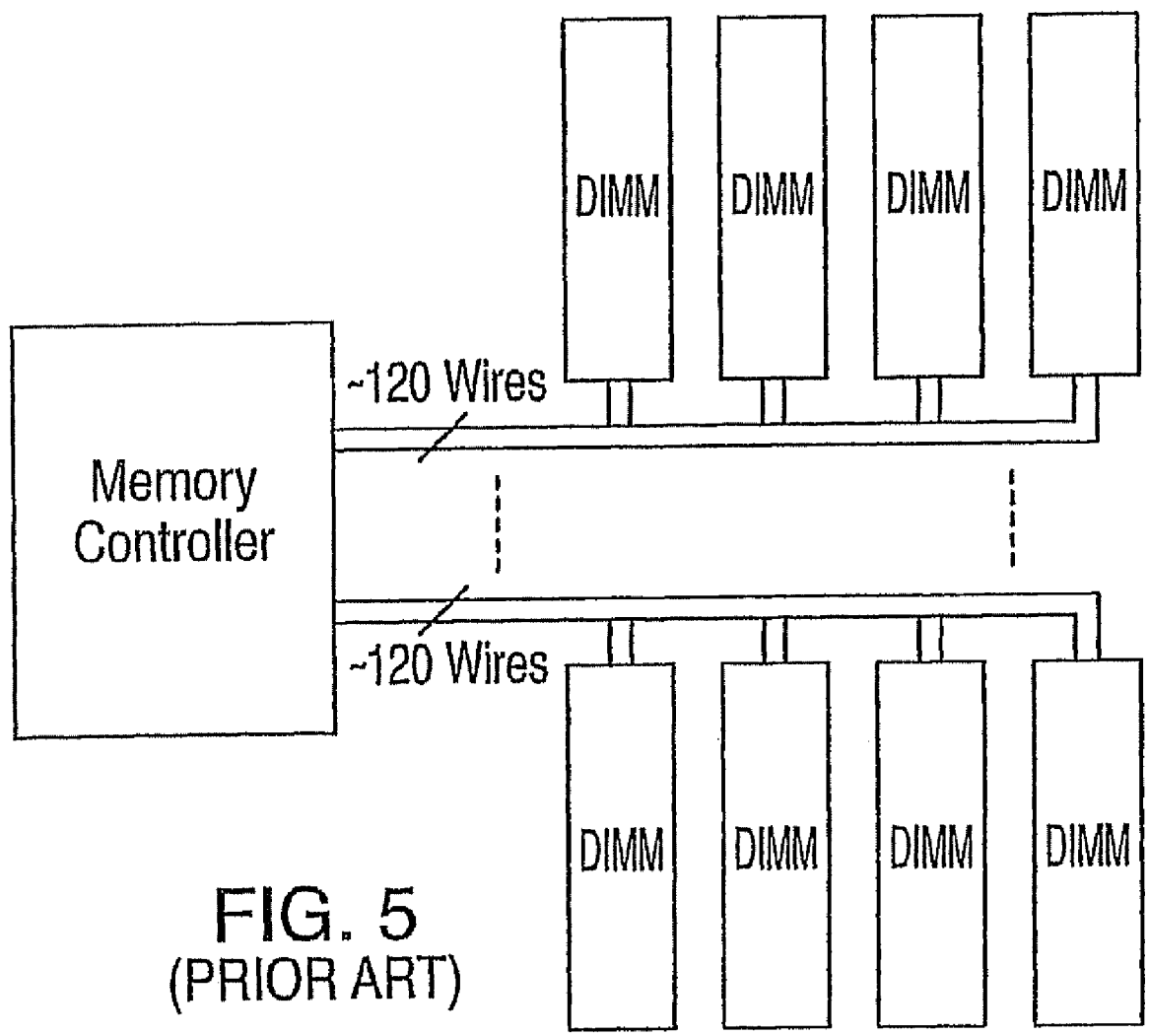
FIG. 5 depicts a prior art memory structure that utilizes a multidrop memory 'stub' bus.
Figure 6:
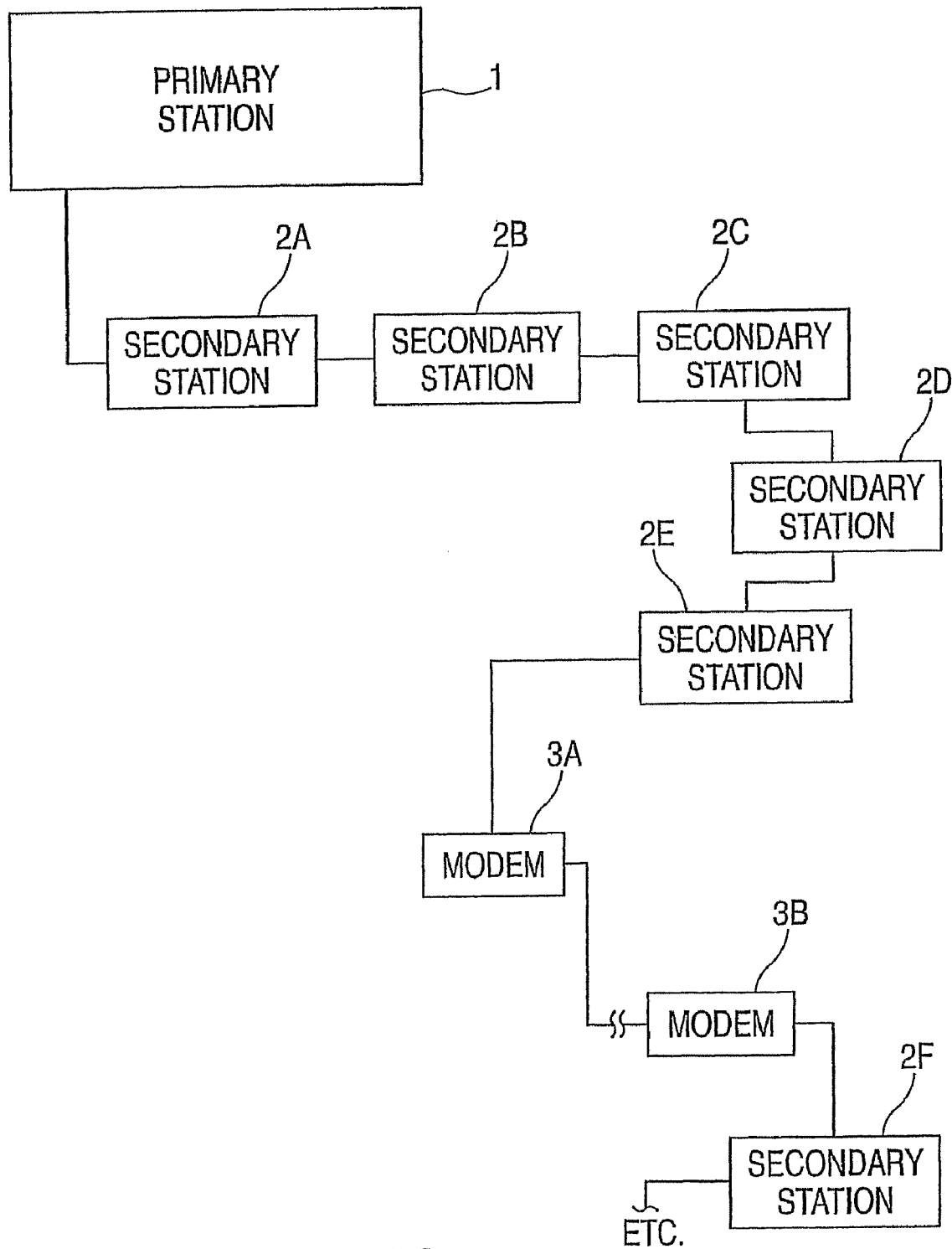
FIG. 6 depicts a prior art daisy chain structure in a multi-point communication structure that would otherwise require multiple ports.
Figure 7:
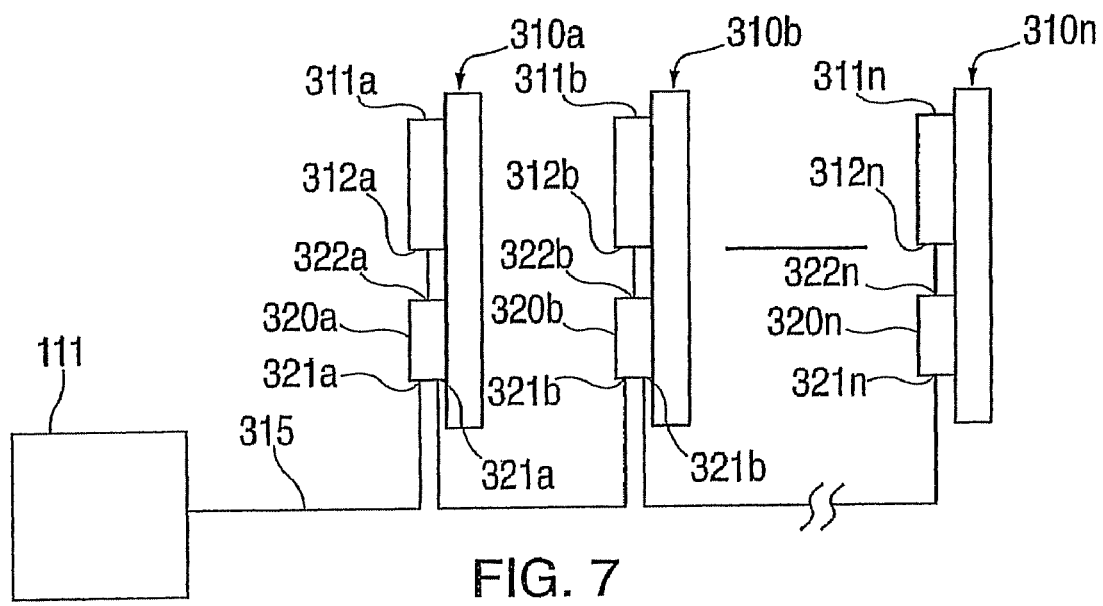
FIG. 7 depicts a prior art daisy chain connection between a memory controller and memory modules.
Figure 8:
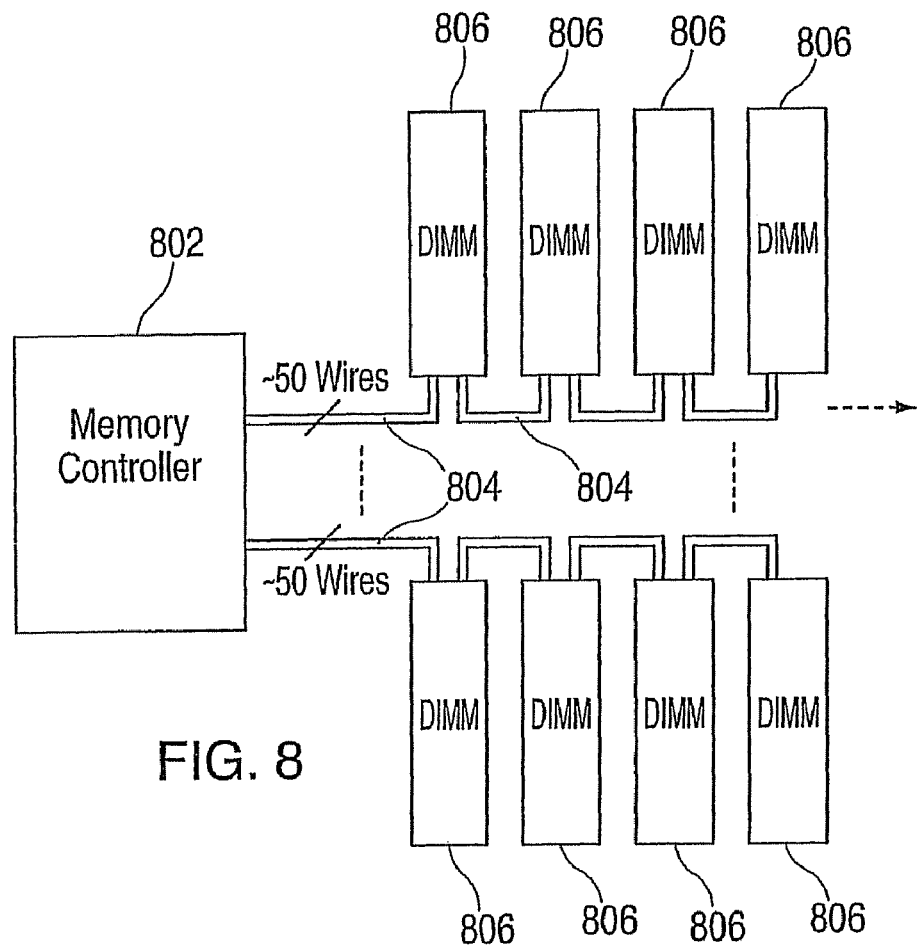
FIG. 8 depicts a cascaded memory structure that may be utilized by exemplary embodiments of the present invention.

FIG. 8 depicts a cascaded memory structure that may be utilized when buffered memory modules 806 (e.g., the buffer device is included within the memory module 806) are in communication with the memory controller 802. This memory structure includes a memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module, to permit memory modules to be cascaded such that each memory module is interconnected to other memory modules as well as to the memory controller 802.

Figure 9:
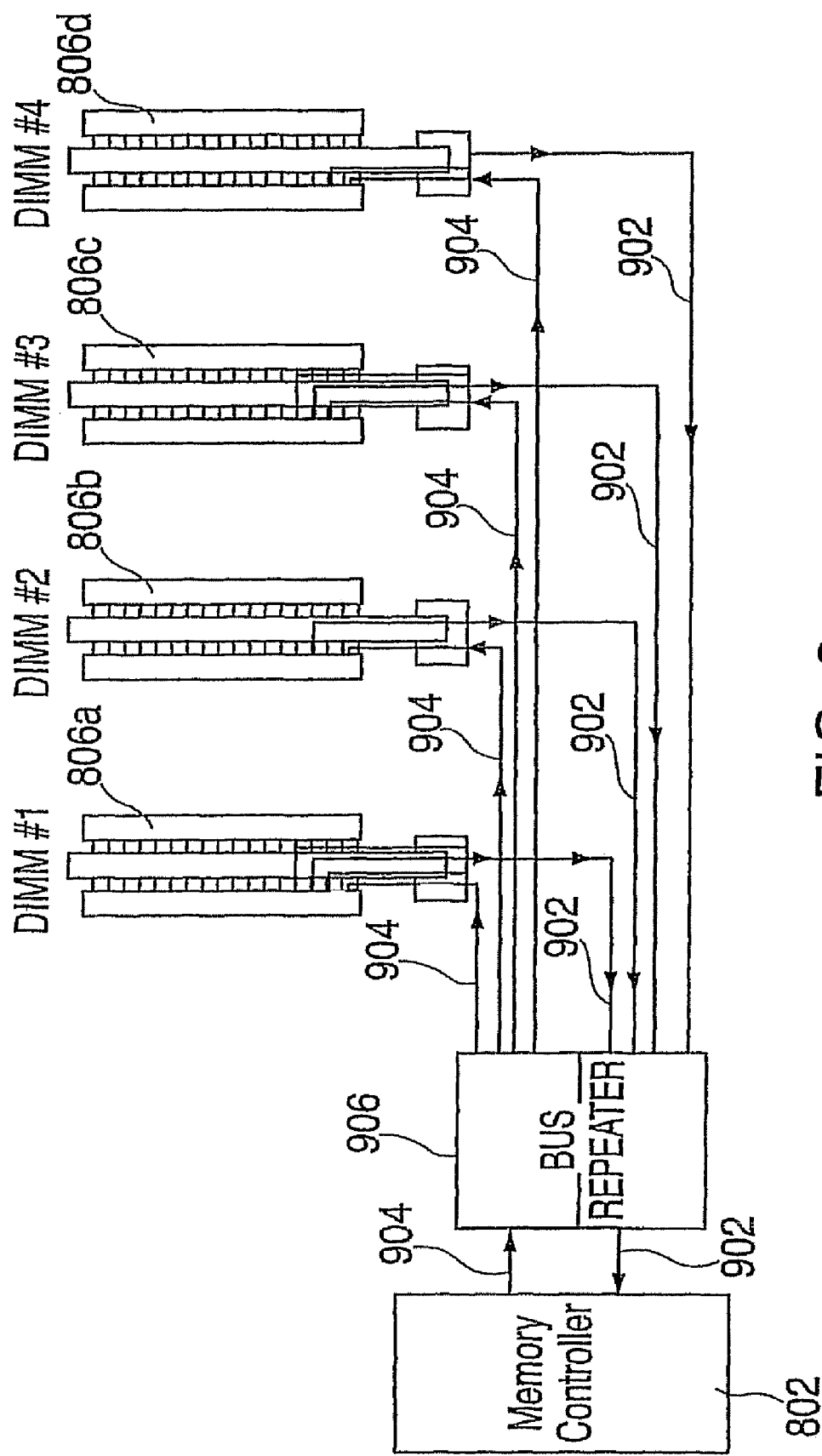
FIG. 9 depicts a memory structure with cascaded memory modules and unidirectional busses and a bus repeater that is utilized by exemplary embodiments of the present invention.
Figures 10, 11:
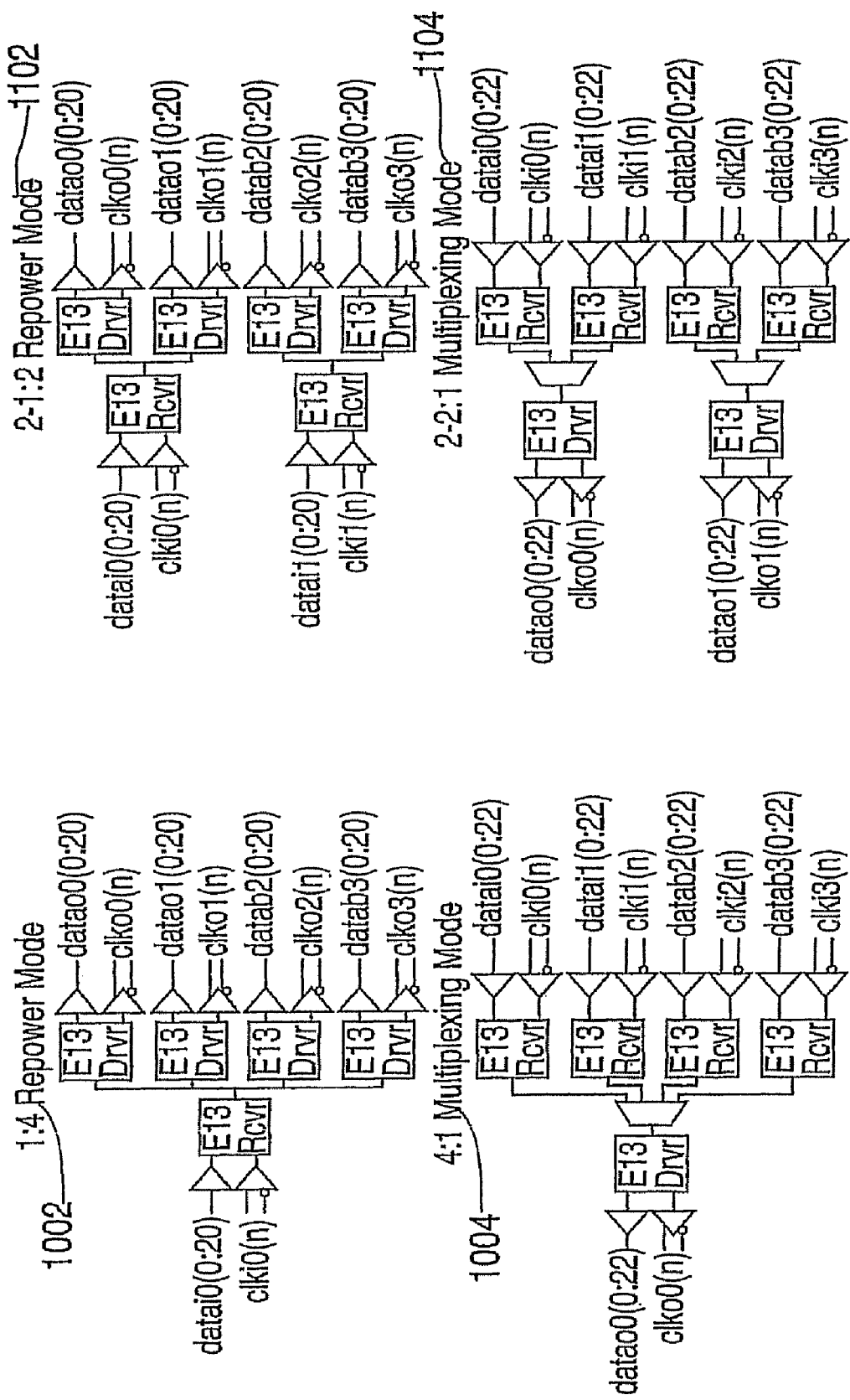
FIG. 10 is block diagram of a one to four repower mode and a four to one multiplexing mode that may be implemented by a bus repeater module in exemplary embodiments of the present invention.
FIG. 11 is a block diagram of a one to two repower mode and a two to one multiplexing mode that may be implemented by a bus repeater module in exemplary embodiments of the present invention.

FIG. 9 depicts a memory structure with memory modules, unidirectional busses and a bus repeater module that is utilized by exemplary embodiments of the present invention. FIG. 9 includes a bus repeater module 906 that is connected to a memory controller 802. The bus repeater module 906 is utilized to transmit signals on the memory bus to/from memory modules 806 within the memory structure. Exemplary embodiments of operating modes that may be implemented by the bus repeater module 906 are depicted in FIGS. 10 and 11. FIG. 9 also includes four memory modules 806a, 806b, 806c and 806d, on each of two memory busses (a downstream memory bus 904 and an upstream memory bus 902), connected to the bus repeater module 906 in a point to point manner.

An exemplary embodiment of the present invention includes two uni-directional busses between the memory controller 802 and the bus repeater module 906. The bus repeater module 906, in turn is directly connected to the memory modules 806a-d ("DIMM #1", "DIMM #2", "DIMM #3" and "DIMM #4") memory structure. The downstream memory bus 904 is comprised of twenty-two single-ended signals (including a signal for a spare bit) and a differential clock pair. The downstream memory bus 904 is used to transfer address, control, data and error code correction (ECC) bits downstream from the memory controller 802 to the bus repeater 906 (over several clock cycles) and then to one or more of the memory modules 806 installed on the cascaded memory channel. The upstream memory bus 902 is comprised of twenty-three single-ended signals (including a signal for a spare bit) and a differential clock pair, and is used to transfer bus-level data and ECC bits upstream from the sourcing memory module 806 to the memory controller 802, via the bus repeater 906. The memory busses include a plurality of segments (e.g., each wire, or signal, between the bus repeater module 906 and the memory modules 806a-d; and each wire, or signal, between the memory controller 802 and the bus repeater module 906). Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Utilizing the memory structure depicted in FIG. 9, the latency for each memory module 806 is symmetrical because each memory module 806 is connected to the bus repeater 906 in a point-to-point manner. In contrast, the latency in the cascaded memory structure depicted in FIG. 8 provides an increased latency, as compared to the structure in FIG. 9, for any memory modules 806 placed more than two drops away from the memory controller 802. In the event of an uncorrectable memory module 806 failure, any communication downstream from the failing module may not be possible due to the cascaded bus structure depicted in FIG. 8. In contrast, the memory structure depicted in FIG. 9, that includes the bus repeater module 906, prevents a faulty memory module 806 from impacting the continued operation of the remaining memory modules 806.

Further, the memory structure depicted in FIG. 9 allows for memory mirroring (parallel write and read operations to two memory modules 806 instead of one and completing read operations from the second memory module 806 if the first memory module 806 if found to have uncorrectable errors) to be supported without having to utilize non-symmetrical memory latency between the two memory modules 806. This is possible because the bus repeater module 906 has direct connections to each memory module 806. Still further, the memory structure depicted in FIG. 9, with the bus repeater 906 inserted between the memory controller 802 and the memory modules 806, increases the maximum bus length to permit support for memory module 806 that are a greater distance from the memory controller 802. This increase may be permitted because each channel segment could be at the maximum length allowed by the channel design, and multiple segments could be combined, via bus repeater modules 906, to achieve the required total length.

The bus repeater module 906 does not have to be in communication with the memory controller 802. In alternate exemplary embodiments of the present invention, the bus repeater module(s) 906 may be positioned between two memory modules in a cascaded memory structure (e.g., 806a and 806b, 806b and 806c, and 806c and 806d) and not between the memory controller 802 and each memory module 806a-d. In addition, a bus repeater module 906 may be positioned between one memory module 806 (e.g., 806a) and a plurality of other memory modules 806 (e.g., 806b-d). Further, the bus repeater module 906 may be implemented as a single unit as depicted in FIG. 9 or as a plurality of physical units. Other configurations are possible when implementing the bus repeater module 906 in conjunction with memory systems. For example, a memory system may include the downstream bus 904 depicted in FIG. 9 with a bus repeater module 906 and an upstream bus 902 implemented using the cascaded memory bus 804 depicted in FIG. 8 (i.e., no bus repeater module 906). In another example, a memory system includes the upstream bus 902 depicted in FIG. 9 with a bus repeater module 906 and a downstream bus 904 implemented using the cascaded memory bus 804 depicted in FIG. 8 (i.e., no bus repeater module 906).

In alternate exemplary embodiments of the present invention, the memory controller 802 in FIG. 9 may be replaced with a communication assembly (e.g., a communication controller), the upstream bus 902 and downstream bus 904 bus may be replaced with a communication medium (e.g., one or more communication busses) and the memory modules 806a-d replaced with communication assemblies. The memory controller 802 may be replaced with a communication assembly such as a transmitter (implemented, for example, by a communication controller). The transmitter may be utilized to encode and transmit a message via the communication medium. The communication medium may be implemented by cable, wire, voice, and/or any other method of transport. The memory modules 806a-d may be replaced with receivers (implemented, or example, by communication controllers). The receiver may be utilized to receive messages from the communication medium and then to decode the messages. In alternate exemplary embodiments the transmitter also performs receiver functions and the receiver also performs transmitter functions.

FIG. 10 is block diagram of a one to four repower mode 1002 and a four to one multiplexing mode 1004 that may be implemented by a bus repeater module 906 in exemplary embodiments of the present invention. Referring to the one to four repower mode 1002, the memory controller 802 initiates an operation to one or more memory modules 806 located downstream from the memory controller 802 via the downstream bus 904. The downstream bus 904 is then repowered by the bus repeater 906 to four identical copies of the downstream data bus 904 (datao0, datao1, datao2 and datao3). All downstream memory modules 806 will monitor the downstream data bus 904 to see if the data are targeted for them. The targeted memory module 806 will receive and act on the received information, while the rest of the memory modules 806 will ignore the data once the error checking and command decoding indicates that the access is not intended for them. This mode provides uniform memory latency among all memory modules 806 since all of the memory modules 806 have a direct point-to-point connection to the bus repeater (s) 906. In the event of an uncorrectable error on one or more of the memory modules 806, the rest of the memory modules 806 will still be in operational mode because of the point to point connections.

Referring to the four to one multiplexing mode 1004, the memory modules 806 are supplying the data (datai0, datai1, datai2 and datai3) and the bus repeater 906 multiplexes the data onto one upstream bus 902 (datao0) toward the memory controller 802. Again, memory latency is uniform among all memory modules 806. In the event of an uncorrectable error on one or more of the memory modules 806, given that there are point-to-point connections to all memory modules 806 from the bus repeater 906, the rest of the memory modules 806 will still be operational. The use of the one to four repower mode and the four to one multiplexing mode are complimentary, in that a system would generally use both operating modes to create a memory system with read and write capability.

FIG. 11 is a block diagram of a one to two repower mode and a two to one multiplexing mode that may be implemented by a bus repeater module 906 in exemplary embodiments of the present invention. Referring to the one to two repower mode 1102, there are physically two separate one to two repowering functions. This structure allows the memory controller 802 to operate twice as many downstream busses 904 (datai0 and datai1) as compared to only one downstream bus 904 (datai0) in a conventional mode, while keeping uniform memory latency. This mode may also serve as a memory mirroring solution by having the memory controller 802 supply the same data source (datai0 and datai1 respectively) to two memory modules 806, thereby replicating the data across datao0, datao1, datao2 and datao3. In another embodiment, the memory controller 802 may supply two separate data sources (where datai0 and datai1 are not the same) which are repowered onto datao0, datao1 for datai0 and onto datao2 and datao3 for dataa1. In the event of an uncorrectable error on one or more of the memory modules 806, given that there are point-to-point connections to all memory modules 806 from the bus repeater 906, the rest of the memory modules 806 will still be operational.

Referring to the two to one multiplexing mode 1104 depicted in FIG. 11, the memory modules 806 are supplying the datai0 and datai1 which are multiplexed onto datao0 while the datai2 and datai3 are multiplexed onto datao1. This provides increased bandwidth as compared to the four to one multiplexor mode, with the same uniform memory latency toward the memory controller 802. Memory mirroring can be utilized in this structure whereas the memory controller 802 would choose from datao0 and datao1. In the event of an uncorrectable error on one or more of the memory modules 806, given that there are point-to-point connections to all memory modules 806 from the bus repeater module 906, the rest of the memory modules 806 will still be operational. All four switching modes depicted in FIGS. 10 and 11 may be utilized for data mirroring and/or for increasing memory bus bandwidth. The mirroring schemes and modes described herein intended to be examples and other mirroring schemes may be implemented with exemplary embodiments of the present invention. For example, referring to FIG. 10, memory mirroring may be implemented by replicating the single data source into four identical copies to provide quadruple redundancy for selected mission critical applications.

Figure 12:
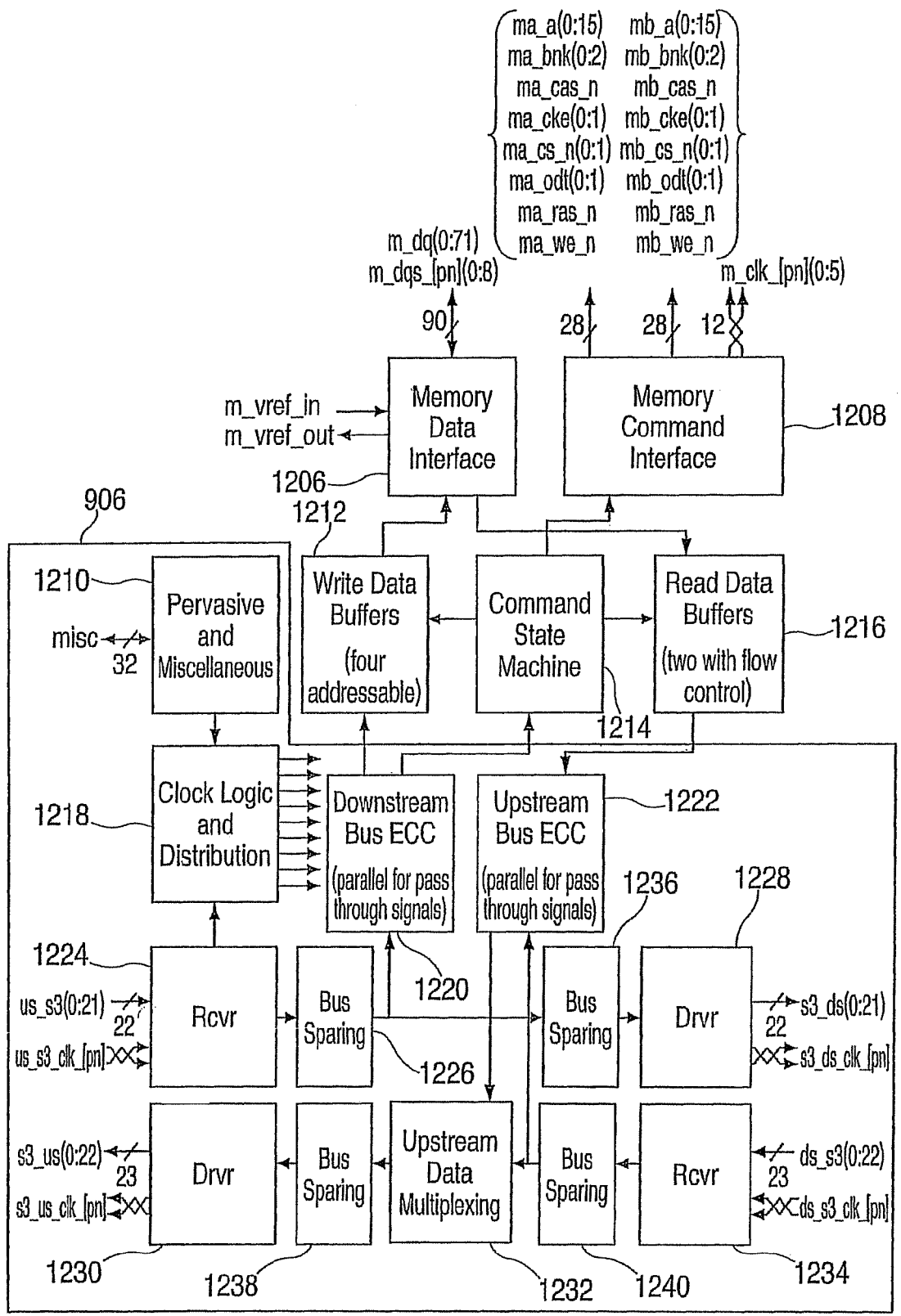
FIG. 12 is a block diagram of a bus repeater module high level logic flow as utilized by exemplary embodiments of the present invention.

FIG. 12 is a block diagram of the high level logic flow of a bus repeater module 906 that may be implemented by exemplary embodiments of the present invention to provide segment level sparing and/or other enhanced functionality. The bus repeater module 906 may be located on a memory module 806 as described previously and/or located on a system board or card. The blocks in the lower left and right portions of the drawing (1224, 1228, 1230, 1234) are associated with receiving or driving the high speed bus 804. "Upstream" refers to the bus 902 passing information in the direction of the memory controller 802, and "downstream" refers to the bus 904 passing information away from the memory controller 802.

Referring to FIG. 12, data, command, address, ECC, and clock signals from an upstream memory assembly (i.e., a memory module 806), a memory controller 802 and/or a bus repeater module 906 are received from the downstream memory bus 904 into a receiver module 1224. The receiver functional block 1224 provides macros and support logic for the downstream memory bus 904 and, in an exemplary embodiment of the present invention includes support for a twenty-two bit, high speed, slave receiver bus. The receiver functional block 1224 transmits the clock signals to a clock logic and distribution functional block 1218 (e.g., to generate the four to one clock signals). The clock logic and distribution functional block 1218 also receives data input from the pervasive and miscellaneous signals 1210. These signals typically include control and setup information for the clock distribution PLL's, test inputs for BIST (built-in self-test) modes, programmable timing settings, etc. The receiver functional block 1224 transfers the data, command, ECC and address signals to a bus sparing logic block 1226 to reposition, when applicable, the bit placement of the data in the event that a spare wire utilized during the transmission from the previous memory assembly. In an exemplary embodiment of the present invention, the bus sparing logic block 1226 is implemented by a multiplexor to shift the signal positions, if needed. Next, the original or re-ordered signals are input to another bus sparing logic block 1236 to modify, or reorder if necessary, the signal placement to account for any defective interconnect that may exist between the current memory assembly and a downstream memory assembly. The original or re-ordered signals are then input to a driver functional block 1228 for transmission, via the downstream memory bus 904, to the next memory module 806 in the chain. In an exemplary embodiment of the present invention, the bus sparing logic 1236 is implemented using a multiplexor. The driver functional block 1228 provides macros and support logic for the downstream memory bus 904 and, in an exemplary embodiment of the present invention, includes support for the twenty-two bit, high speed, low latency cascade bus drivers.

In addition to inputting the original or re-ordered signals to the bus sparing logic 1236, the bus sparing logic 1226 also inputs the original or re-ordered signals into a downstream bus ECC functional block 1220 to perform error detection and correction for the frame. The downstream bus ECC functional block 1220 operates on any information received or passed through the bus repeater module 906 from the downstream memory bus 904 to determine if a bus error is present. The downstream bus ECC functional block 1220 analyzes the bus signals to determine if it they are valid. Next, the downstream bus ECC functional block 1220 transfers the corrected signals to a command state machine 1214. The command state machine 1214 inputs the error flags associated with command decodes or conflicts to a pervasive and miscellaneous functional block 1210. The downstream and upstream modules also present error flags and/or error data (if any) to the pervasive and miscellaneous functional block 1210 to enable reporting of these errors to the memory controller, processor, service processor or other error management unit.

Referring to FIG. 12, the pervasive and miscellaneous functional block 1210 transmits error flags and/or error data to the memory controller 802. By collecting error flags and/or error data from each memory module 806 in the structure, the memory controller 802 will be able to identify the failing segment(s), without having to initiate further diagnostics, though additional diagnostics may be completed in some embodiments of the design. In addition, once an installation selected threshold (e.g., one, two, ten, or twenty) for the number of failures or type of failures has been reached, the pervasive and miscellaneous functional block 1210, generally in response to inputs from the memory controller 802, may substitute the spare wire for the segment that is failing. In an exemplary embodiment of the present invention, error detection and correction is performed for every group of four transfers, thereby permitting operations to be decoded and initiated after half of the eight transfers, comprising a frame, are received. The error detection and correction is performed for all signals that pass through the memory module 806 from the downstream memory bus 904, regardless of whether the signals are to be processed by the particular memory module 806. The data bits from the corrected signals are input to the write data buffers 1212 by the downstream bus ECC functional block 1220.

The command state machine 1214 also determines if the corrected signals (including data, command and address signals) are directed to and should be processed by the memory module 806. If the corrected signals are directed to the memory module 806, then the command state machine 1214 determines what actions to take and may initiate DRAM action, write buffer actions, read buffer actions or a combination thereof. Depending on the type of memory module 806 (buffered, unbuffered, registered), the command state machine 1214 selects the appropriate drive characteristics, timings and timing relationships. The write data buffers 1212 transmit the data signals to a memory data interface 1206 and the command state machine 1214 transmits the associated addresses and command signals to a memory command interface 1208, consistent with the DRAM specification. The memory data interface 1206 reads from and writes memory data 1242 to a memory device. The data timing relationship to the command is different depending on the type of memory module 806. For example, when the memory data interface 1206 issues a command to a registered DIMM memory module 804, the command takes an extra clock cycle as compared to a command issued to an unbuffered DIMM memory module 806. In addition, the memory command interface 1208 outputs six differential clocks on twelve wires. To support the use of both unbuffered and registered memory modules 806, the memory a outputs 1204 and the memory b outputs 1202 from the memory command interface 1208 can be logically configured based on the type of memory module 806. For example, when the multi-mode memory device is in communication with two unbuffered DIMM memory modules 806, the memory a outputs 1204 may be directed to the first unbuffered DIMM memory module 806 and the memory b outputs 1202 may be directed to the second unbuffered DIMM memory module 806.

Data signals to be transmitted to the memory controller 802 may be temporarily stored in the read data buffers 1216 after a command, such as a read command, has been executed by the memory module 806, consistent with the memory device 'read' timings. The read data buffers 1216 transfer the read data into an upstream bus ECC functional block 1222. The upstream bus ECC functional block 1222 generates check bits for the signals in the read data buffers 1216. The check bits and signals from the read data buffers 1216 are input to the upstream data multiplexing functional block 1232. The upstream data multiplexing functional block 1232 merges the data on to the upstream memory bus 902 via the bus sparing logic 1238 and the driver functional block 1230. If needed, the bus sparing logic 1238 may re-direct the signals to account for a defective segment between the current memory module 806 and the upstream receiving module (or memory controller). The driver functional block 1230 transmits the original or re-ordered signals, via the upstream memory bus 902, to the next memory assembly (i.e., memory module 806) or memory controller 802 in the chain. In an exemplary embodiment of the present invention, the bus sparing logic 1238 is implemented using a multiplexor to shift the signals. The driver functional block 1230 provides macros and support logic for the upstream memory bus 902 and, in an exemplary embodiment of the present invention, includes support for a twenty-three bit, high speed, low latency cascade driver bus.

Data, clock and ECC signals from the upstream memory bus 902 are also received by any upstream bus repeater module 906 in any upstream memory module 806. These signals need to be passed upstream to the next memory module 806 or to the memory controller 802. Referring to FIG. 12, data, ECC and clock signals from a downstream memory assembly (i.e., a memory module 806) are received on the upstream memory bus 902 into a receiver functional block 1234. The receiver functional block 1234 provides macros and support logic for the upstream memory bus 902 and, in an exemplary embodiment of the present invention includes support for a twenty-three bit, high speed, slave receiver bus. The receiver functional block 1234 passes the data and ECC signals, through the bus sparing functional block 1240, to the upstream data multiplexing functional block 1232 and then to the bus sparing logic block 1238. The signals are transmitted to the upstream memory bus 902 via the driver functional block 1230.

In addition to passing the data and ECC signals to the upstream data multiplexing functional block 1232, the bus sparing functional block 1240 also inputs the original or re-ordered data and ECC signals to the upstream bus ECC functional block 1222 to perform error detection and correction for the frame. The upstream bus ECC functional block 1222 operates on any information received or passed through the bus repeater module 906 from the upstream memory bus 902 to determine if a bus error is present. The upstream bus ECC functional block 1222 analyzes the data and ECC signals to determine if they are valid. Next, the upstream bus ECC functional block 1222 transfers any error flags and/or error data to the pervasive and miscellaneous functional block 1210 for transmission to the memory controller 802. In addition, once a pre-defined threshold for the number or type of failures has been reached, the pervasive and miscellaneous functional block 1210, generally in response to direction of the memory controller 802, may substitute the spare segment for a failing segment.

The block diagram in FIG. 12 is one implementation of a bus repeater module 906 that may be utilized by exemplary embodiments of the present invention. The bus repeater module 906 depicted in FIG. 12 provides segment level sparing and bus level ECC. Other implementations are possible without departing from the scope of the present invention.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing a memory interface, the method comprising:
receiving an input signal at a bus repeater module, the input signal from a cascaded memory bus including a plurality of segments and a spare segment in parallel with the plurality of segments;
determining a mode associated with the bus repeater module;
repositioning bits in the input signal in response to one of the bits being associated with a failing segment in the plurality of segments, the repositioning including substituting the spare segment for the failing segment; and
outputting the input signal to a memory controller or to one or more memory assemblies in response to the mode, the outputting performed via the memory bus.

2. The method of claim 1 wherein the mode is a one to four repower mode and the bus repeater module outputs four identical copies of the input signal to four of the memory assemblies.

3. The method of claim 1 wherein the mode is a four to one multiplexor mode and the bus repeater module multiplexes four input signals into a single signal for output to a memory assembly or to the memory controller.

4. The method of claim 1 wherein the mode is a one to two repower mode and the bus repeater module outputs two identical copies of the input signal to two of the memory assemblies.

5. The method of claim 4 wherein the one to two repower mode performs mirroring functions.

6. The method of claim 1 wherein the mode is a two to one multiplexor mode and the bus repeater module multiplexes two input signals into a single signal for output to a memory assembly or to the memory controller.

7. The method of claim 6 wherein the two to one multiplexor mode performs mirroring functions.

8. The method of claim 1 further comprising performing bus level error detection and correction functions.

9. The method of claim 1 wherein the segments each carry a single signal and the input signal comprises a plurality of single signals each received via a different one of the segments.

10. A storage medium encoded with machine readable computer program code for providing a memory interface, the storage medium including instructions for causing a computer to implement a method comprising:
receiving an input signal at a bus repeater module, the input signal from a cascaded memory bus including a plurality of segments and a spare segment in parallel with the plurality of segments;
determining a mode associated with the bus repeater module;
repositioning bits in the input signal in response to one of the bits being associated with a failing segment in the plurality of segments, the repositioning including substituting the spare segment for the failing segment; and
outputting the input signal to a memory controller or to one or more memory assemblies in response to the mode, the outputting performed via the memory bus.

11. A method for providing a communication interface, the method comprising:
receiving an input signal at a bus repeater module, the input signal from a cascaded communication bus including a plurality of segments and a spare segment in parallel with the plurality of segments;
determining a mode associated with the bus repeater module;
repositioning bits in the input signal in response to one of the bits being associated with a failing segment in the plurality of segments, the repositioning including substituting the spare segment for the failing segment; and
outputting the input signal to one or more communication assemblies in response to the mode, the outputting performed via the communication bus.

12. The method of claim 11 wherein the mode is a one to four repower mode and the bus repeater module outputs four identical copies of the input signal to four of the communication assemblies.

13. The method of claim 11 wherein the mode is a four to one multiplexor mode and the bus repeater module multiplexes four input signals into a single signal for output to a communication assembly.

14. The method of claim 11 wherein the mode is a one to two repower mode and the bus repeater module outputs two identical copies of the input signal to two of the communication assemblies.

15. The method of claim 14 wherein the one to two repower mode performs mirroring functions.

16. The method of claim 11 wherein the mode is a two to one multiplexor mode and the bus repeater module multiplexes two input signals into a single signal for output to a communication assembly.

17. The method of claim 16 wherein the two to one multiplexor mode performs mirroring functions.

18. The method of claim 11 further comprising performing bus level error detection and correction functions.

19. The method of claim 11 wherein the segments each carry a single signal and the input signal comprises a plurality of single signals each received via a different one of the segments.

20. A storage medium encoded with machine readable computer program code for providing a storage interface, the storage medium including instructions for causing a computer to implement a method comprising:

receiving an input signal at a bus repeater module, the input signal from a cascaded communication bus including a plurality of segments and a spare segment in parallel with the plurality of segments;

determining a mode associated with the bus repeater module;

repositioning bits in the input signal in response to one of the bits being associated with a failing segment in the plurality of segments, the repositioning including substituting the spare segment for the failing segment; and outputting the input signal to one or more communication assemblies in response to the mode, the outputting performed via the communication bus.

* * * * *